US012596922B2

(12) United States Patent
Cantin et al.

(10) Patent No.: US 12,596,922 B2
(45) Date of Patent: **\*Apr. 7, 2026**

(54) ACCELERATING NEURAL NETWORKS IN HARDWARE USING INTERCONNECTED CROSSBARS

(71) Applicant: Google LLC, Mountain View, CA (US)

(72) Inventors: Pierre-Luc Cantin, Palo Alto, CA (US); Olivier Temam, Antony (FR)

(73) Assignee: Google LLC, Mountain View, CA (US)

( * ) Notice: Subject to any disclaimer, the term of this patent is extended or adjusted under 35 U.S.C. 154(b) by 27 days.

This patent is subject to a terminal disclaimer.

(21) Appl. No.: 18/612,881

(22) Filed: Mar. 21, 2024

(65) Prior Publication Data

US 2024/0232603 A1     Jul. 11, 2024

Related U.S. Application Data

(63) Continuation of application No. 16/059,578, filed on Aug. 9, 2018, now Pat. No. 11,966,833.

(Continued)

(51) Int. Cl.
*G06N 3/065* (2023.01)
*G06F 9/50* (2006.01)
(Continued)

(52) U.S. Cl.
CPC ........... *G06N 3/065* (2023.01); *G06F 9/5027* (2013.01); *G06F 17/16* (2013.01); *G06N 3/04* (2013.01)

(58) Field of Classification Search
CPC . G06N 3/065; G06N 3/04; G06N 3/08; G06F 9/5027; G06F 17/16
See application file for complete search history.

(56) References Cited

U.S. PATENT DOCUMENTS 7,302,513 B2 * 11/2007 Mouttet ............... H03K 19/177
977/708
8,812,415 B2     8/2014 Modha et al.
(Continued)

FOREIGN PATENT DOCUMENTS

EP          1115204       4/2009
TW       201714120       4/2017
TW       201723934       4/2017

OTHER PUBLICATIONS

Continuous Real-World Inputs Can Open Up Alternative Accelerator Designs (Year: 2013).*

(Continued)

*Primary Examiner* — Omar F Fernandez Rivas
*Assistant Examiner* — Shamcy Alghazzy
(74) *Attorney, Agent, or Firm* — Fish & Richardson P.C.

(57) ABSTRACT

A computing unit for accelerating a neural network is disclosed. The computing unit include an input unit that includes a digital-to-analog conversion unit and an analog-to-digital conversion unit that is configured to receive an analog signal from the output of a last interconnected analog crossbar circuit of a plurality of analog crossbar circuits and convert the second analog signal into a digital output vector, and a plurality of interconnected analog crossbar circuits that include the first interconnected analog crossbar circuit and the last interconnected crossbar circuits, wherein a second interconnected analog crossbar circuit of the plurality of interconnected analog crossbar circuits is configured to receive a third analog signal from another interconnected analog crossbar circuit of the plurality of interconnected crossbar circuits and perform one or more operations on the third analog signal based on the matrix weights stored by the crosspoints of the second interconnected analog crossbar.

20 Claims, 3 Drawing Sheets

200

Fully-Connected Neural Network
Dedicated Crossbar Circuits For Each Layer

Related U.S. Application Data

(60) Provisional application No. 62/543,251, filed on Aug. 9, 2017.

(51) Int. Cl.
    *G06F 17/16*         (2006.01)
    *G06N 3/04*         (2023.01)

(56) References Cited

U.S. PATENT DOCUMENTS

| | | | |
|---|---|---|---|
| 2017/0109628 A1 | 4/2017 | Gokmen | |
| 2017/0228345 A1 | 8/2017 | Gupta et al. | |
| 2018/0005115 A1 | 1/2018 | Goknnen | |
| 2018/0075338 A1 | 3/2018 | Goknnen | |
| 2018/0075339 A1* | 3/2018 | Ma | G06N 3/04 |
| 2018/0114569 A1 | 4/2018 | Strachan et al. | |
| 2020/0159811 A1* | 5/2020 | Chatterjee | G06F 17/16 |

OTHER PUBLICATIONS

Memristive_Boltzmann_machine_A_hardware_accelerator_for_combinatorial_optimization_and_deep_learning (Year: 2016).*

ISAAC: A Convolutional Neural Network Accelerator with In-Situ Analog Arithmetic in Crossbars (Year: 2016).*

On-chip Training of Memristor Based Deep Neural Networks (Year: 2017).*

Hu—Memristor Crossbar-Based Neuromorphic Computing System a Case Study (Year: 2014).*

Li—Emerging memristor technology enabled next generation cortical processor (Year: 2014).*

Liu—Hardware Acceleration for Neuromorphic Computing (Year: 2015).*

Tang—Spiking Neural Network with RRAM (Year: 2015).*

Esteves et al., "Polar Transformer Networks," CoRR, Submitted on Feb. 1, 2018, arXiv:1709.01889v3, 14 pages.

Hasan et al., "On-chip Training of Memristor Based Deep Neural Networks," Presented at International Joint Conference on Neural Networks, Anchorage AK, May 14-19, 2017, 10 pages.

Hu et al., "Dot-Product Engine for Neuromorphic Computing: Programming 1T1M Crossbar to Accelerate Matrix-Vector Multiplication," Proceedings of the 53rd Annual Design Automation Conference on DAC, Jun. 5, 2016, 6 pages.

International Search Report and Written Opinion in International Appln. No. PCT/US2018/046069, mailed on Nov. 14, 2018, 15 pages.

Li et al. "RRAM-Based Analog Approximate Computing," IEEE Transactions on Computer Aided Design of Integrated Circuits and Systems, IEEE, Dec. 1, 2015, 34(12):13 pages.

Li et al., "Dense Transformer Networks," CoRR, Submitted on Jun. 8, 2017, arXiv:1705.08881v2, 10 pages.

Li et al., "Training itself: Mixed-signal training acceleration for memristor-based neural network," 19th Asia and South Pacific Design Automation Conference, Jan. 20, 2014, 6 pages.

Lin et al., "Inverse Compositional Spatial Transformer Networks," CoRR, Submitted on Dec. 12, 2016, arXiv:1612.03897v1, 9 pages.

Office Action in Taiwan Application No. 107127883, mailed on Jun. 21, 2019, 11 pages (with English translation).

Shafiee et al., "ISAAC: A Convolutional Neural Network Accelerator with In-Situ Analog Arithmetic in Crossbars," ACM SIGARCH Computer Architecture News, Oct. 12, 2016, 44(3):13 pages.

Tang et al., "Binary Convolutional Neural Network on RRAM," Presented at 22nd Asia and South Pacific Design Automation Conference, Chiba, Japan, Jan. 16-19, 2017, pp. 782-787.

\* cited by examiner

Convolutional Neural Network
Time-Sharing Crossbar Circuits

Fully-Connected Neural Network
Dedicated Crossbar Circuits For Each Layer

Fully-Connected Neural Network
Dedicated Crossbar Circuits For Each Layer

FIG. 3

ACCELERATING NEURAL NETWORKS IN HARDWARE USING INTERCONNECTED CROSSBARS

CROSS-REFERENCE TO RELATED APPLICATION

This application is a continuation and claims priority of U.S. patent application Ser. No. 16/059,578, filed Aug. 9, 2018, which claims the benefit of U.S. Provisional Application No. 62/543,251, filed Aug. 9, 2017, the contents of which are incorporated by reference herein.

BACKGROUND

This specification generally relates to computer hardware for accelerating computation of neural networks.

Neural networks are machine-learning models that employ multiple layers of operations to predict one or more outputs, e.g., a classification, for one or more received inputs. Neural networks typically include one or more hidden layers situated between an input layer and an output layer. The output of each layer is used as input to another layer in the network, e.g., the next hidden layer or the output layer.

Each layer of a neural network specifies one or more transformation operations to be performed on an input to the layer. The transformation operations can be characterized by values of internal parameters of the neural network. Some neural network layers have operations that are referred to as neurons. Each neuron receives one or more inputs and generates an output that is received by another neural network layer. Often, each neuron receives inputs from other neurons, and each neuron provides an output to one or more other neurons.

An architecture of a neural network specifies what layers are included in the network and their properties, as well as how the neurons of each layer of the network are connected. In other words, the architecture specify which layers provide their output as input to which other layers and how the output is provided.

FIG. 1 is a conceptual diagram of a portion of a prior art circuit 100 that can be used to accelerate computation of a neural network. The prior art circuit 100 includes multiple crossbar circuits 110-1, 110-2, 110-3, 110-4, 110-n, respective digital-to-analog conversion units (DAC) 120-1, 120-2, 120-3, 120-4, 120-n with at least one DAC unit used to convert an analog signal output by a respective crossbar circuit 110-1, 110-2, 110-3, 110-4, 110-n to a digital signal, and respective analog-to-digital conversion units (ADC) 130-1, 130-2, 130-3, 130-4, 130-n with at least one ADC unit used to convert a digital signal provided as an input to a respective cross bar circuit 110-1, 110-2, 110-3, 110-4, 110-n to an analog signal, where n is any positive, non-zero integer. The aforementioned components of the prior art circuit 100 highlight that the prior art circuit 100 requires a DAC unit and an ADC unit to be available to covert the output of a crossbar circuit to a digital signal or to convert the input to the crossbar circuit to an analog signal for each respective crossbar circuit 110-1, 110-2, 110-3, 110-4, 110-n, respectively.

The prior art circuit 110 is configured to perform hardware acceleration of a convolutional neural network. Convolutional neural network layers have sparse connectivity, with each neuron in a convolutional layer receiving input from only a subset of the neurons in the next lowest neural network layer. Generally, convolutional neural network layers have neurons that share weights with other neurons in the layer. Each layer of the convolutional neural network includes a respective matrix of weights that can be loaded into a respective crossbar circuit 110-1, 110-2, 110-3, 110-4, 110-n. Each weight of the matrix of weights be stored at crosspoints in the crossbar circuit such as crosspoint 112.

Like many neural network layers, the outputs of a prior layer of a convolutional neural network must be input into the current layer where the outputs of the prior layer can be merged with the weights of the current layer to produce the outputs of the current layer. The outputs of the prior layer be aggregated in a DRAM buffer until there are enough outputs for the next layer to begin performing operations in the next layer. Then, once there are enough outputs from the prior layer to begin performing operations in the next layer, the outputs from the prior layer stored in the DRAM buffer can be loaded into the next layer.

This functionality of a convolutional neural network requires DAC converters 120-1, 120-2, 120-3, 120-4, 120-n to be made available at the input of each crossbar circuit 110-1, 110-2, 110-3, 110-4, 110-n when implemented using prior art circuitry. The DAC converters are required to be made available at the input of each crossbar circuit 110-1, 110-2, 110-3, 110-4, 110-n for multiple reasons. For example, the DAC converters in some implementations convert digital inputs being obtained from a digital memory unit such as a DRAM unit into an analog signal that can be loaded into one of the respective crossbar circuits 110-1, 110-2, 110-3, 110-4, 110-n. Likewise, the analog outputs of each respective crossbar circuit 110-1, 110-2, 110-3, 110-4, 110-n must be converted into a digital signal using an ADC converter 130-1, 130-2, 130-3, 130-4, 130-n available to the crossbar circuit 110-1, 110-2, 110-3, 110-4, 110-n. Then analog outputs of each crossbar circuit 110-1, 110-2, 110-3, 110-4, 110-n must be converted back to a digital value so that the output of the crossbar circuit 110-1, 110-2, 110-3, 110-4, 110-n can be buffered in a digital memory unit such as a DRAM unit prior to providing the crossbar circuit output as an input to a DAC unit that precedes the next crossbar circuit. Alternatively, or in addition, the prior art circuit uses (i) the DAC converters at the input of each crossbar circuit and (ii) the ADC converters at the output of each crossbar circuit because other digital operations are being performed using digital arithmetic components that require a digital input and produce respective digital outputs.

The prior art circuit can perform dot-product computations using the crossbar circuits e.g., by using memristive crossbar circuits that can naturally perform dot-product operations. For example, if an array of voltage signals is applied to the rows of a crossbar, the current measured at a column of the crossbar will be a weighted summation of the inputs with each input signal being multiplied by the conductance or 'weight' of the corresponding cross-point of the memristive device.

This prior art circuit also relies on timesharing of analog crossbar circuits 110-1, 110-2, 110-3, 110-4, 110-n. This is because the prior art circuit utilizes fewer total crossbar circuits than layers of the convolutional neural network. This requires that different weights of different neural network layers to be loaded into a particular crossbar circuit during inference at runtime. This extra processing required at each layer of the crossbar of a hardware accelerated convolutional neural network can be so great that it negates the speed improvements obtained by implementing the neural network using crossbar circuits.

SUMMARY

In general, one innovative aspect of the subject matter disclosed by this specification can be embodied in a circuit for accelerating computation by a neural network.

In more detail, one innovative aspect of the present disclosure includes a computing unit for accelerating a neural network. The computing unit include an input unit that includes a digital-to-analog conversion unit that is configured to receive a digital input vector and convert the digital input vector into a first analog signal that is provided as an input to a first interconnected analog crossbar circuit of a plurality of analog crossbar circuits, an output unit that includes an analog-to-digital conversion unit that is configured to receive as an input a second analog signal from the output of a last interconnected analog crossbar circuit of a plurality of analog crossbar circuits and convert the second analog signal into a digital output vector, and a plurality of interconnected analog crossbar circuits that include the first interconnected analog crossbar circuit and the last interconnected crossbar circuits, wherein each interconnected analog crossbar circuit of the plurality of interconnected analog crossbar circuits corresponds to a particular layer of the neural network, wherein each interconnected analog crossbar circuit includes a plurality of crosspoints, wherein each crosspoint stores a weight of a plurality of weights associated with a layer of a neural network to which the interconnected analog crossbar circuit corresponds, wherein one or more of the interconnected analog crossbar circuits is configured to receive as an input a third analog signal from another interconnected analog crossbar circuit of the plurality of interconnected crossbar circuits and perform one or more operations on the third analog signal based on the matrix weights stored by the crosspoints of the interconnected analog crossbar circuit that received the third analog signal to generate an output analog signal.

These and other versions optionally include one or more of the following features. For instance, in some implementations, the one or more operations include performing matrix multiplication operations on the third analog signal based on the matrix weights stored by the crosspoints of the interconnected analog crossbar circuit that received the third analog signal to generate an output analog signal.

In some implementations, the neural network include a fully-connected neural network.

In some implementations, the computing unit not include any other digital-to-analog conversion units that generate an analog output based on a digital vector for input to an interconnected analog crossbar circuit other than the digital-to-analog conversion unit of the input unit.

In some implementations, the computing unit not include any other analog-to-digital conversion units that generate a digital output based on an input that includes an analog signal output by an interconnected analog crossbar circuit other than the analog-to-digital conversion unit of the output unit.

In some implementations, each crossbar circuit of the plurality of interconnected analog crossbar circuits other than the first crossbar circuit is configured to receive as input an analog output generated by a previous analog crossbar circuit.

In some implementations, the computing unit further include at least one array of analog signal amplifiers that is positioned between a second analog crossbar circuit and a third analog crossbar circuit.

In some implementations, at least one array of analog signal amplifiers is configured to (i) receive as an input an analog output generated by the second analog crossbar circuit and (ii) generate as an output an analog output for use as an input to a fourth analog crossbar circuit.

In some implementations, each crossbar circuit of the plurality of interconnected analog crossbar circuits other than the first crossbar circuit is configured to receive as an input (i) an analog output generated by a previous analog crossbar circuit or (ii) an analog output generated by the at least one array of analog signal amplifiers.

The hardware accelerated neural network described by the present disclosure provides for multiple advantages over conventional hardware accelerated neural network circuits. By way of example, one advantage achieve by the present disclosure is that a full neural network is expanded into hardware by directly interconnecting multiple crossbars and without having to go back and forth to memory (SRAM or DRAM) via analog to digital conversion (ADC or DAC). This is a significant advantage because most of the energy and area gains of analog processing can be wiped out by ADC/DAC conversions. Accordingly, significantly better energy and area performance gains can be achieved by using analog neural networks while simultaneously reducing the amount of ADC/DAC operations that need to be performed. For purposes of the present disclosure, a "full neural network" means all the weights or parameters of a neural network.

Yet other advantages are provided by the present disclosure. For example, the hardware accelerated neural network circuit described by the present disclosure is faster than conventional hardware accelerated neural network circuits. The hardware accelerated neural network circuit described by the present disclosure is faster than the conventional circuits described herein because the hardware accelerated neural network circuits described by the present disclosure do not perform digital-to-analog and analog-to-digital conversions between each pair of interconnected crossbar circuits. In addition, the elimination of the need to perform digital-to-analog conversions and analog-to-digital conversions between each pair of interconnected crossbar circuits results in a hardware accelerated neural network circuit that consumes less power than conventional hardware accelerated neural network circuits. In some implementations, an array of amplifiers be used between interconnected crossbar circuits to reduce noise that be introduced due to signal degradation after multiple crossbar circuit layers have processed an analog input. These, and other, potential features, aspects, and advantages of the present disclosure will become apparent from the description, the drawings, and the claims.

BRIEF DESCRIPTION OF THE DRAWINGS

FIG. 3 is another conceptual diagram of a portion of a circuit that can be used to accelerate computation of a neural network in accordance with the present disclosure.

DETAILED DESCRIPTION

Figure 1:
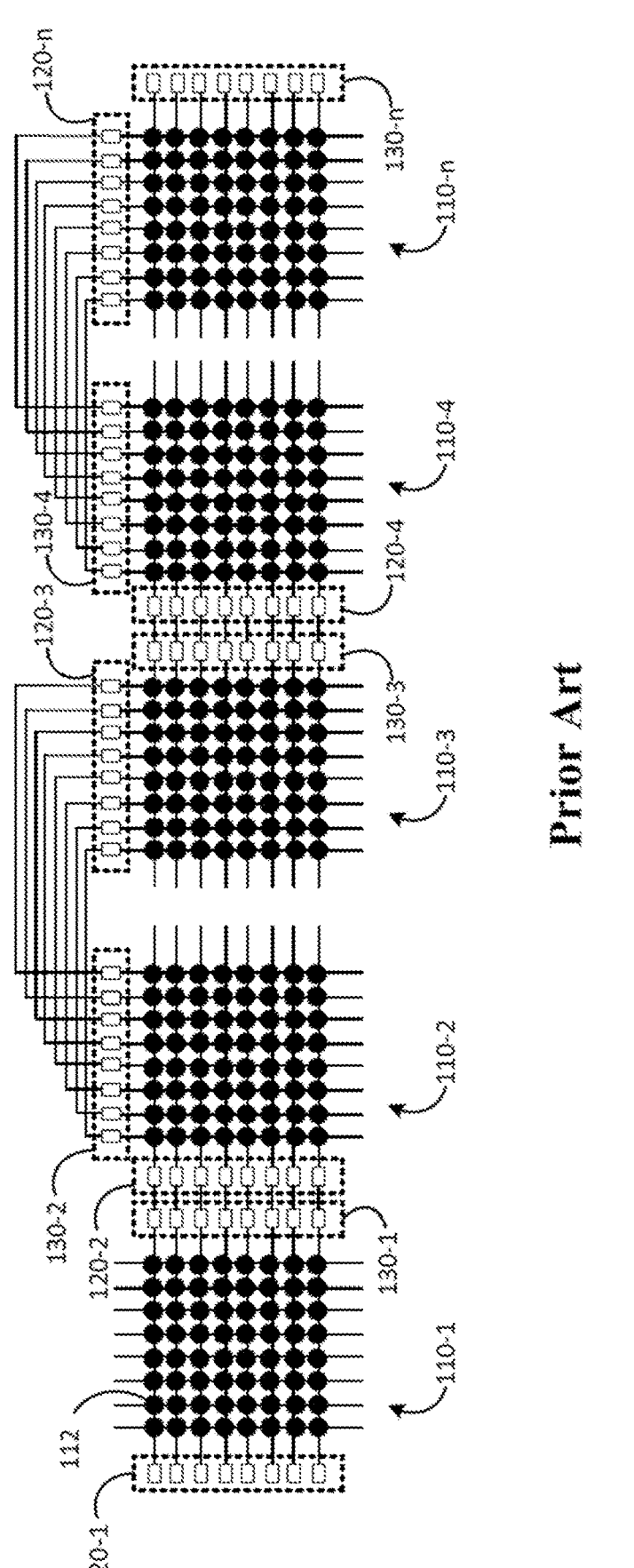
FIG. 1 is a conceptual diagram of a portion of a prior art circuit that can be used to accelerate computation of a neural network.

This specification generally describes accelerating neural networks using interconnected crossbar circuits. A crossbar circuit is an analog circuit that includes a plurality of switches arranged in a matrix configuration. The matrix configuration be based on a crossed pattern established between input paths to the crossbar and output paths from the crossbar. The crossed pattern of a crossbar establish a plurality of crosspoints. Each crosspoint of the plurality of crosspoints be configured to store a value associated with a matrix of values represented by the crossbar circuit. In some implementations, a crossbar circuit include a floating-gate crossbar that is configured to use one or more floating gate transistors to hold a value at each crosspoint. Alternatively, a crossbar circuit achieve the aforementioned matrix configuration of crosspoints using one or more solid state semiconductor computer chips. Such solid state semiconductor computer chips include flash memory.

Alternatively, a crossbar achieve the aforementioned matrix configuration of crosspoints using an intersection of metal bars that provide the input and output paths that result in an intersection defining the crosspoint.

The neural network accelerator of the present disclosure is achieved by partially, or fully, expanding a neural network across a plurality of interconnected crossbar circuits. In such instances, each crossbar circuit of the plurality of interconnected crossbar circuits is configured to represent a particular layer of the neural network. A crossbar circuit can be configured to represent a particular layer of the neural network by loading a matrix of weights associated with the particular layer of the neural network into the matrix of crosspoint storage locations of the crossbar circuit. A matrix of weights be loaded into respective crosspoint storage locations in this manner for each neural network layer that is represented by the neural network accelerator. A neural network can be fully expanded in the neural network accelerator if the respective matrix of weights for all layers of the neural network have been loaded into a different crossbar circuit. Alternatively, a neural network can be partially expanded in the neural network accelerator if the respective matrix of weights for less than all of the neural networks have been loaded into one of the crossbar circuits.

The present disclosure is directed to a hardware accelerated neural network using interconnected crossbar circuits in a manner that addresses, and overcomes, the primary limitations of conventional hardware accelerated neural networks that use interconnected crossbar circuits. First, the present disclosure significantly reduces the number of analog-to-digital (ADC) and digital-to-analog (DAC) conversions required when using interconnected crossbars to accelerate a neural network. In particular, by employing a fully-connected neural network that does not timeshare crossbar circuits, the present disclosure can eliminate the need for ADC and DAC conversions between serially connected crossbar circuits. This provides two significant advantages over conventional systems. First, not timesharing crossbar circuits eliminates the need to reload neural network weights into one or more crossbar circuits during inference at runtime. Eliminating the need to reload neural network weights into one or more crossbar circuits during inference at runtime significantly increases the processing speed of the neural network accelerator described by the present disclosure. Second, elimination of ADC and DAC conversions between each set of serially connected crossbar circuits achieves significant performance gains by significantly reducing power consumed by the neural network accelerator configured using the interconnected crossbars as described by this specification. The difference in circuit architecture between the hardware accelerated neural network of the present disclosure and conventional hardware accelerated neural networks that provide the aforementioned advantages is described with reference to FIGS. 2 and 3 below.

Figure 2:
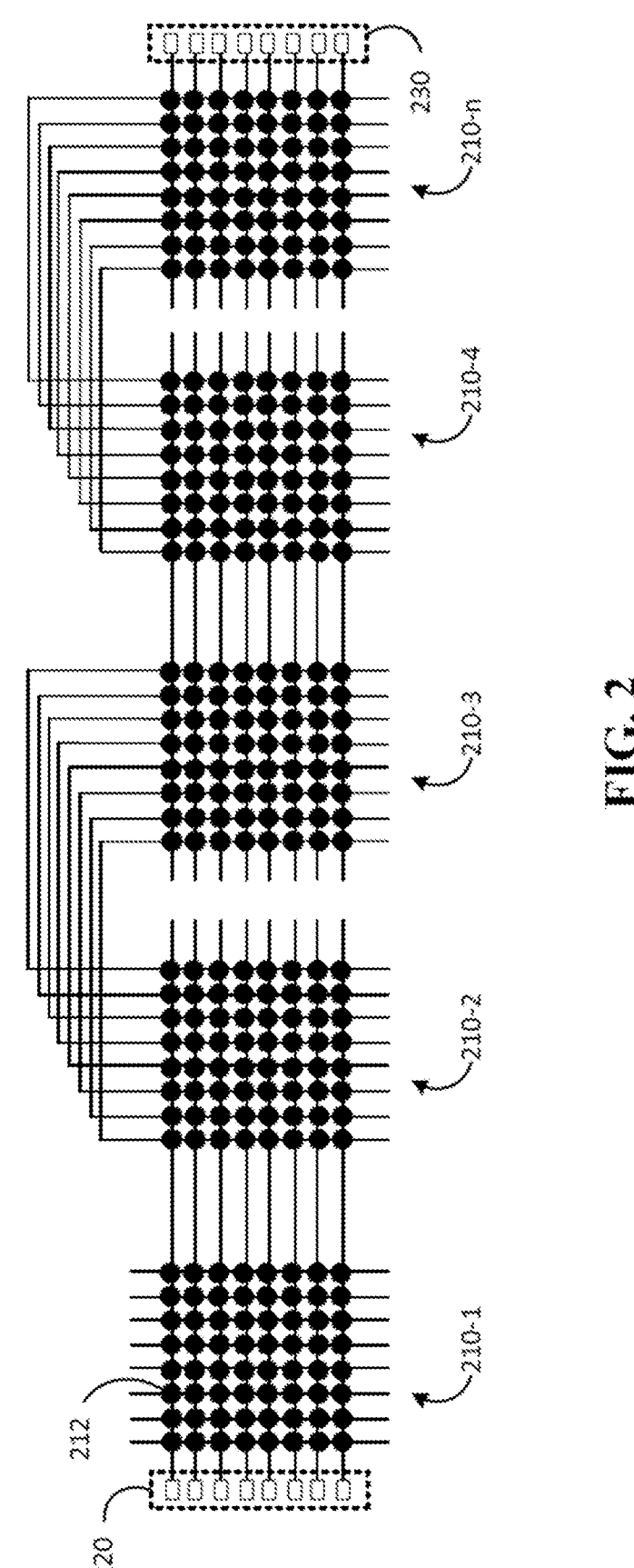
FIG. 2 is a conceptual diagram of a portion of a circuit that can be used to accelerate computation of a neural network in accordance with the present disclosure.

FIG. 2 is a conceptual diagram of a portion of a circuit 200 that can be used to accelerate computation of a neural network in accordance with the present disclosure. The circuit 200 includes multiple crossbar circuits 210-1, 210-2, 210-3, 210-4, 210-n (where n is any positive, non-zero integer greater than one), an input unit that includes a digital-to-analog conversion unit 220, and an output unit that includes an analog-to-digital conversion unit 230.

The circuit 200 is different than the prior art circuit 100 because the circuit 200 does not require a DAC unit at the input of each crossbar circuit 210-1, 210-2, 210-3, 210-4, 210-n and an ADC unit at the output of each crossbar circuit 210-1, 210-2, 210-3, 210-4, 210-n. Instead, the circuit 200 only requires a DAC unit 220 in an input unit to the circuit 200 and an ADC unit 230 in an output unit of the circuit 200. The DAC unit 220 functions to convert an initial digital vector input into the circuit 200 into an analog signal that can be provided as input to the first crossbar circuit 210-1. The ADC unit 230 functions to convert the analog output of the last crossbar circuit 210-n so that a digital vector can be output by the circuit 200. The circuit 200 otherwise operates in the analog domain.

The architecture of the circuit 200 increases the performance of the hardware accelerated neural network described by this specification relative to a hardware accelerated neural network implemented using the prior art circuit 100 because fewer digital-to-analog and analog-to-digital conversions are being performed. In some implementations, only one digital-to-analog conversion occurs at the input of the circuit 100 and one analog-to-digital conversion occurs that the output of the circuit 100. As a result, the hardware accelerated neural network implemented using the circuit 200 is faster than the hardware accelerated neural network implemented using the circuit 100 because the hardware accelerated neural network implemented using the circuit 200 does not perform digital-to-analog and analog-to-digital conversions between each pair of crossbar circuits 210-1, 210-2, 210-3, 210-4, 210-n. In addition, the hardware accelerated neural network implemented using the circuit 200 consumes less power than a hardware accelerated neural network implemented using the circuit 100 as a result of the significant reduction in digital-to-analog and analog-to-digital conversions that are performed.

The circuit 200 can efficiently operate using the architecture shown in FIG. 2—i.e., an architecture that does not include a DAC unit and an ADC unit between each pair of crossbar circuits 210-1, 210-2, 210-3, 210-4, 210-n—because the circuit 200 is a hardware accelerated implementation of a fully-connected neural network. A fully-connected neural network is a neural network where, for each pair of layers in the neural network, each neuron of a first layer of the neural network is connected to each of the neurons of a previous layer of the neural network.

The circuit 200 can be initialized by loading the matrices of weights maintained by each respective layer of a fully-connected neural network into a corresponding crossbar circuit 210-1, 210-2, 210-3, 210-4, 210-n. For example, the weights maintained by a matrix of a first layer of a fully connected neural network may be loaded into a first crossbar circuit 210-1, weights maintained by a matrix of a second layer of a fully connected neural network may be loaded into a second crossbar circuit 210-2, and the like. Each weight of the matrix of weights for a particular neural network layer may be stored in a corresponding crosspoint 212 of a corresponding crossbar circuit.

Each respective crossbar circuit of the plurality of crossbar circuits 210-1, 210-2, 210-3, 210-4, 210-n may be configured to receive analog inputs. Furthermore, each respective crossbar circuit of the plurality of crossbar circuits 210-1, 210-2, 210-3, 210-4, 210-n other than the first crossbar circuit 210-1 may be configured to receive analog signals as inputs that are based on the analog output of the immediately preceding crossbar circuit. For example, the crossbar circuit 210-2 may be configured to receive the analog outputs of crossbar circuit 210-1 as an input. The analog output of the crossbar circuit 210-1 (or any of the other analog crossbar circuits of FIG. 2) may include, for example, activations of the crossbar circuit 210-1. After receiving the analog outputs of the crossbar circuit 210-1 as an input, the crossbar circuit 210-2 may perform operations on the received input such as matrix multiplications in view of the weights stored by the crossbar circuit 210-2 without loading any additional weights from digital memory units. With Memristive crossbar circuits, dot-product operations may be performed naturally. (See "A multiply-add engine with monolithically integrated 3D memristor crossbar/CMOS hybrid circuit," B. Chakrabarti, et al.). For example, if an array of voltage signals is applied to the rows of a crossbar, the current measured at a column of the crossbar will be a weighted summation of the inputs with each input signal being multiplied by the conductance or 'weight' of the corresponding cross-point of the memristive device. (id.). However, the present disclosure need not be limited to a computing unit or circuit that performs matrix multiplications. Instead, the computing unit or circuit can have crossbar circuits, amplifiers, or any combination thereof, configure to emulate other operations such as activation functions.

The analog output of the crossbar circuit 210-2 that is based on the operations performed by the crossbar circuit 210-2 on the analog output of the crossbar circuit 210-1 may be provided as an input to the crossbar circuit 210-3. This may continue until an original input that was provided via an input unit of the circuit, or a set of activations generated based thereon, is processed by each layer of the fully-connected neural network implemented in the interconnected crossbar circuits of the circuit 200. Once the last crossbar circuit 210-n generates an analog output based on processing the analog output of crossbar circuit 210-4, the analog output of the crossbar circuit 210-n may be provide as an input to an ADC unit 230. The ADC unit 230 may convert the analog output of the last crossbar circuit 210-n to a digital output vector. The generated digital output vector is the output of the circuit 200.

The circuit 200 may be densely organized to facilitate several interconnected crossbar circuits representative of a fully-connected neural network. The dense organization of the interconnected crossbar circuits may achieved because of the small size of the crossbars. For example, in some implementations, each respective crossbar circuit 210-1, 210-2, 210-3, 210-4, 210-n may facilitate 10 million parameters, a 100 million parameters, or even more. For example, 10 million parameters may be facilitated by crossbars that are on the order of 1000 inputs×1000 outputs. Such crossbars may be implemented in 65 nanometer technology. Larger circuits accommodating more parameters may be implemented using the present disclosure, however the size of the circuit may begin to increase.

Figure 3:
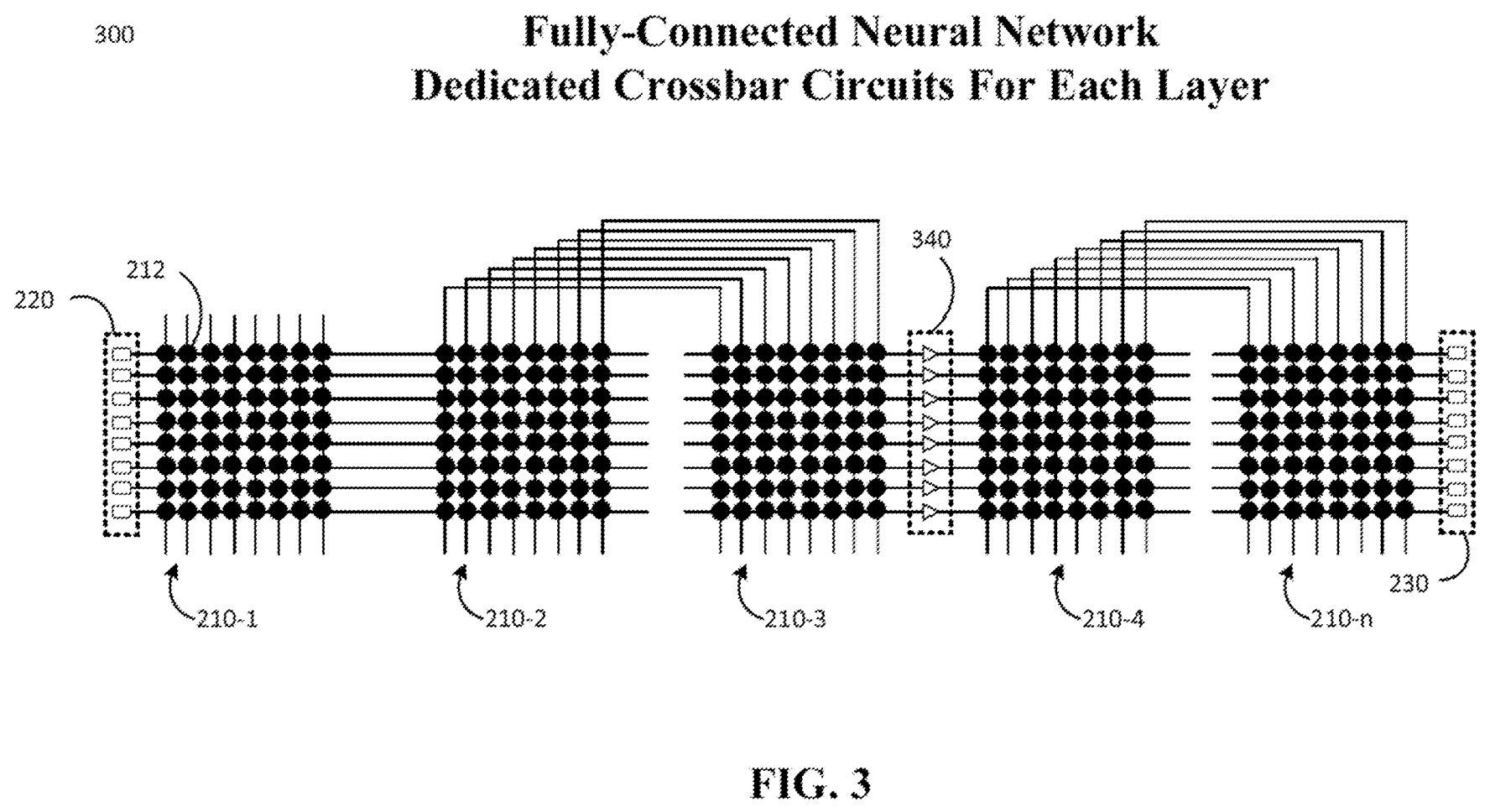

FIG. 3 is another conceptual diagram of a portion of a circuit 300 that can be used to accelerate computation of a neural network in accordance with the present disclosure. The circuit 300 is generally the same as the circuit 200, as the circuit 300 also includes multiple crossbar circuits

210-1, 210-2, 210-3, 210-4, 210-n (where n is any positive, non-zero integer), an input unit that includes a digital-to-analog conversion unit 220, and an output unit that includes an analog-to-digital conversion unit 230. However, the circuit 300 differs from the circuit 200 in that the circuit 300 includes at least one array of amplifiers 340.

The circuit 300 may be initialized by loading a fully-connected neural network onto the circuit 300. This may include, for example, loading the matrices of weights maintained by each respective layer of a fully-connected neural network into a corresponding crossbar circuit 210-1, 210-2, 210-3, 210-4, 210-n.

Generally, the operation of the circuit 300 between the DAC unit 320 and the ADC unit 330 is entirely in the analog domain. As a result, there may be configurations of the circuit 300, as n becomes increasingly large, where noise starts to be introduced into the system. In such instances, one or more arrays of amplifiers 340 may be introduced into the circuit 300 in-between every L pairs of crossbar circuits. For example, an array of amplifiers 340 may be installed between the output of the crossbar circuit 210-3 and the input of the crossbar circuit 210-4. In such instances, the array of amplifiers 340 may be configured to receive the analog output of the crossbar circuit 210-3 and boost the signal strength of the analog signal before providing the boosted analog signal as an input to the crossbar circuit 210-4. However, the present disclosure need not be so limited and amplifiers need not be placed in between each pair of crossbar circuits. Accordingly, different implementations of the present disclosure may exist that have different values of L such as L=1, 2, 4, 6, 8, or any other integer value greater than 0 in order to boost the analog signal to a desired signal strength.

The circuit 300 provides advantages that are similar in scope to the advantages achieved by the circuit 200. For example, the circuit 300 generally operates in the analog domain, therefore eliminating the need for DAC units between pairs of crossbars. Moreover, since the circuit 300 implements a fully-connected neural network, there is no dynamic loading of weights into the crosspoints 212 of respective crossbars during inference at runtime because each of the necessary weights were loaded into the crosspoints 212 of respective crossbars when the circuit 300 was initialized.

In some implementations, the neural network is fully implemented on the circuit 200 or 300, i.e., all of the layers of the neural network are implemented on the circuit. In other implementations, some of the layers are implemented off-chip in a manner that does not result in timesharing of the crossbars of the circuit 200 or 300. In these implementations, one of the circuits 200, 300 can be used to accelerate the computation of a subset of neural network layers of a neural network, with the remaining layers being computed by one or more other computing units before and/or after the use of the circuits 200, 300. For example, one or more convolutional layers of a neural network may be computed in a first computing unit, with the results being output to the circuit 200, 300. The circuit 200, 300 can use these results to compute a sequence of fully connected layers of the neural network to complete the neural network computation. As another example, the output layer of the network can be a softmax layer that is implemented on a host device while the remainder of the neural network is implemented in hardware on the circuit. It will be appreciated that any combination of the neural network accelerator circuits 200, 300 and other circuits for computing neural network layers is possible when computing a complete neural network.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

The invention claimed is:

1. A computing unit for accelerating a neural network, comprising:
a plurality of interconnected analog crossbar circuits comprising a first analog crossbar circuit, a last analog crossbar circuit, and a set of intermediary analog crossbar circuits between the first analog crossbar circuit and the last analog crossbar circuit, wherein:
each interconnected analog crossbar circuit corresponds to a respective layer of the neural network and includes a plurality of crosspoints, each crosspoint storing a weight of a plurality of weights associated with the respective layer of the neural network,
wherein each analog crossbar circuit in the set of intermediary analog circuits receives an analog input from a preceding analog crossbar circuit and provides an analog output to a subsequent analog crossbar circuit;
a single digital-to-analog conversion (DAC) unit, wherein the single DAC unit is configured to convert a digital input vector into a first analog signal that is provided as an input to the first analog crossbar circuit; and
a single analog-to-digital conversion (ADC) unit, wherein the single ADC unit is configured to receive as an input a second analog signal from an output of the last analog crossbar circuit and convert the second analog signal into a digital output vector.

2. The computing unit of claim 1, wherein at least one analog crossbar circuit in the plurality of interconnected analog crossbar circuits is configured to perform matrix multiplication operations on an analog signal received by the at least one analog crossbar circuit based on the weights stored by the crosspoints of the at least one analog crossbar circuit.

3. The computing unit of claim 1, wherein the neural network is a fully-connected neural network.

4. The computing unit of claim 1, wherein each crossbar circuit of the plurality of interconnected analog crossbar circuits other than the first crossbar circuit is configured to receive as input an analog output generated by a preceding analog crossbar circuit in the plurality of interconnected analog crossbar circuits.

5. The computing unit of claim 1, further comprising:
at least one array of analog signal amplifiers that is positioned between a pair of analog crossbar circuits in the plurality of interconnected analog crossbar circuits.

6. The computing unit of claim 5, wherein the at least one array of analog signal amplifiers is configured to (i) receive as an input an analog output generated by a second analog crossbar circuit and (ii) generate as an analog output for use as an input to a third analog crossbar circuit.

7. The computing unit of claim 5, wherein each crossbar circuit of the plurality of interconnected analog crossbar circuits other than the first crossbar circuit is configured to receive as an input (i) an analog output generated by a preceding analog crossbar circuit or (ii) an analog output generated by the at least one array of analog signal amplifiers.

8. A method of configuring a computing unit for accelerating a neural network, the method comprising:
configuring a plurality of interconnected analog crossbar circuits comprising a first analog crossbar circuit, a last analog crossbar circuit, and a set of intermediary analog crossbar circuits between the first analog crossbar circuit and the last analog crossbar circuit, wherein:
each interconnected analog crossbar circuit corresponds to a respective layer of the neural network and includes a plurality of crosspoints, each crosspoint storing a weight of a plurality of weights associated with the respective layer of the neural network,
wherein each analog crossbar circuit in the set of intermediary analog circuits receives an analog input from a preceding analog crossbar circuit and provides an analog output to a subsequent analog crossbar circuit;
configuring a single digital-to-analog conversion (DAC) unit to convert a digital input vector into a first analog signal that is provided as an input to the first analog crossbar circuit; and
configuring a single analog-to-digital conversion (ADC) unit to receive as an input a second analog signal from an output of the last analog crossbar circuit and convert the second analog signal into a digital output vector.

9. The method of claim 8, wherein at least one analog crossbar circuit in the plurality of interconnected analog crossbar circuits is configured to perform matrix multiplication operations on an analog signal received by the at least one analog crossbar circuit based on the weights stored by the crosspoints of the at least one analog crossbar circuit.

10. The method of claim 8, wherein the neural network is a fully-connected neural network.

11. The method of claim 8, wherein each crossbar circuit of the plurality of interconnected analog crossbar circuits other than the first crossbar circuit is configured to receive as input an analog output generated by a preceding analog crossbar circuit in the plurality of interconnected analog crossbar circuits.

12. The method of claim 8, further comprising:

at least one array of analog signal amplifiers that is positioned between a pair of analog crossbar circuits in the plurality of interconnected analog crossbar circuits.

13. The method of claim 12, wherein the at least one array of analog signal amplifiers is configured to (i) receive as an input an analog output generated by a second analog crossbar circuit and (ii) generate as an analog output for use as an input to a third analog crossbar circuit.

14. The method of claim 12, wherein each crossbar circuit of the plurality of interconnected analog crossbar circuits other than the first crossbar circuit is configured to receive as an input (i) an analog output generated by a preceding analog crossbar circuit or (ii) an analog output generated by the at least one array of analog signal amplifiers.

15. A non-transitory computer storage medium encoded with a computer program, the program comprising instructions that are operable, when executed by a data processing apparatus, to cause the data processing apparatus to perform the operations comprising:

configuring a plurality of interconnected analog crossbar circuits comprising a first analog crossbar circuit, a last analog crossbar circuit, and a set of intermediary analog crossbar circuits between the first analog crossbar circuit and the last analog crossbar circuit, wherein:

each interconnected analog crossbar circuit corresponds to a respective layer of a neural network and includes a plurality of crosspoints, each crosspoint storing a weight of a plurality of weights associated with the respective layer of the neural network, wherein each analog crossbar circuit in the set of intermediary analog circuits receives an analog input from a preceding analog crossbar circuit and provides an analog output to a subsequent analog crossbar circuit;

configuring a single digital-to-analog conversion (DAC) unit to convert a digital input vector into a first analog signal that is provided as an input to the first analog crossbar circuit; and configuring a single analog-to-digital conversion (ADC) unit to receive as an input a second analog signal from an output of the last analog crossbar circuit and convert the second analog signal into a digital output vector.

16. The media of claim 15, wherein at least one analog crossbar circuit in the plurality of interconnected analog crossbar circuits is configured to perform matrix multiplication operations on an analog signal received by the at least one analog crossbar circuit based on the weights stored by the crosspoints of the at least one analog crossbar circuit.

17. The media of claim 15, wherein the neural network is a fully-connected neural network.

18. The media of claim 15, wherein each crossbar circuit of the plurality of interconnected analog crossbar circuits other than the first crossbar circuit is configured to receive as input an analog output generated by a preceding analog crossbar circuit in the plurality of interconnected analog crossbar circuits.

19. The media of claim 15, further comprising:

at least one array of analog signal amplifiers that is positioned between a pair of analog crossbar circuits in the plurality of interconnected analog crossbar circuits.

20. The media of claim 19, wherein the at least one array of analog signal amplifiers is configured to (i) receive as an input an analog output generated by a second analog crossbar circuit and (ii) generate as an analog output for use as an input to a third analog crossbar circuit.

*     *     *     *     *